US008607053B2

(12) United States Patent
Holtmanns

(10) Patent No.: US 8,607,053 B2
(45) Date of Patent: Dec. 10, 2013

(54) SMART CARD SECURITY FEATURE PROFILE IN HOME SUBSCRIBER SERVER

(75) Inventor: Silke Holtmanns, Klaukkala (FI)

(73) Assignee: Nokia Corporation, Espoo (FI)

( * ) Notice: Subject to any disclaimer, the term of this patent is extended or adjusted under 35 U.S.C. 154(b) by 291 days.

(21) Appl. No.: 12/954,120

(22) Filed: Nov. 24, 2010

(65) Prior Publication Data

US 2011/0145583 A1   Jun. 16, 2011

Related U.S. Application Data

(60) Provisional application No. 61/284,045, filed on Dec. 11, 2009.

(51) Int. Cl.
  *H04L 9/32* (2006.01)
(52) U.S. Cl.
  USPC .......... 713/171; 713/151; 713/187; 713/164; 713/191; 726/22; 717/168
(58) Field of Classification Search
  USPC ............ 713/171, 187, 151, 164, 191; 726/22, 726/23; 717/168
  See application file for complete search history.

(56) References Cited

U.S. PATENT DOCUMENTS

| | | | |
|---|---|---|---|
| 7,870,601 B2 * | 1/2011 | Pandey et al. | 726/2 |
| 8,151,314 B2 * | 4/2012 | McCarthy et al. | 725/131 |
| 2004/0172555 A1 * | 9/2004 | Beringer et al. | 713/201 |
| 2004/0205241 A1 * | 10/2004 | Aarnos et al. | 709/245 |
| 2005/0283445 A1 * | 12/2005 | Trinon et al. | 705/75 |
| 2006/0205388 A1 | 9/2006 | Semple et al. | 455/411 |
| 2006/0251257 A1 * | 11/2006 | Haverinen et al. | 380/270 |
| 2007/0101122 A1 | 5/2007 | Guo | 713/153 |
| 2007/0204160 A1 * | 8/2007 | Chan et al. | 713/171 |
| 2008/0171534 A1 * | 7/2008 | Holtmanns et al. | 455/411 |
| 2008/0276301 A1 * | 11/2008 | Nataraj et al. | 726/3 |
| 2009/0235317 A1 * | 9/2009 | Igarashi | 725/82 |

(Continued)

FOREIGN PATENT DOCUMENTS

| | | |
|---|---|---|
| JP | 2002511964 A | 4/2002 |
| JP | 2007510391 A | 4/2007 |

(Continued)

OTHER PUBLICATIONS

The Writer's Handbook Using Semicolons, Jul. 2, 2012, © 2009 Board of Regents of the University of Wisconsin System, http://writing.wisc.edu/Handbook/Semicolons.html.*

(Continued)

*Primary Examiner* — Hadi Armouche
*Assistant Examiner* — Sharif E Ullah
(74) *Attorney, Agent, or Firm* — Harrington & Smith

(57) ABSTRACT

In accordance with the exemplary embodiments of the invention there is at least a method, an executable computer program, and an apparatus to determine at a network application function a list of desired user equipment security features to be used, the security features of the list ordered by preference of the network application function, send the list to a database of user security settings via a bootstrapping server function, and receive by the network application function, via the bootstrapping server function, a security features response including a security key, derived from information stored in the database, corresponding to a desired security feature contained in the list, thereby informing the network application function of the availability of at least one of the desired security features in the user equipment.

18 Claims, 4 Drawing Sheets

(56) References Cited

U.S. PATENT DOCUMENTS

| | | | |
|---|---|---|---|
| 2010/0211635 A1* | 8/2010 | DeAnna et al. | 709/203 |
| 2011/0125807 A1* | 5/2011 | Bland | 707/803 |
| 2011/0145887 A1* | 6/2011 | Morovitz et al. | 726/3 |
| 2012/0042058 A1* | 2/2012 | Shaikh et al. | 709/222 |
| 2012/0222091 A1* | 8/2012 | Castellanos Zamora et al. | 726/3 |

FOREIGN PATENT DOCUMENTS

| | | |
|---|---|---|
| JP | 2008530861 A | 8/2008 |
| JP | 2008538482 A | 10/2008 |
| JP | 2008547248 A | 12/2008 |
| JP | 2009512296 A | 3/2009 |
| RU | 2150790 C1 | 6/2000 |
| WO | WO 2008/084135 A1 | 7/2008 |
| WO | WO-2009/046400 A1 | 4/2009 |

OTHER PUBLICATIONS

"3$^{rd}$ Generation Partnership Project; Technical Specification Group Core Network and Terminals; Generic Authentication Architecture (GAA); Zh and Zn Interfaces based on the Diameter protocol; Stage 3 (Release 9)", 3GPP TS 29.109 V9.0.0, Sep. 2009, 65 pgs.

"3$^{rd}$ Generation Partnership Project; Technical Specification Group Services and System Aspects; Generic Authentication Architecture (GAA); Generic Bootstrapping Architecture (GBA) Push Layer (Release 9)", 3GPP TS 33.224 V9.0.0, Sep. 2009, 22 pgs.

"3$^{rd}$ Generation Partnership Project; Technical Specification Group Services and System Aspects; Generic Authentication Architecture (GAA); Generic Bootstrapping Architecture (GBA) Push function (Release 8)", 3GPP TS 33.223 V8.5.0, Sep. 2009, 23 pgs.

* cited by examiner

SMART CARD SECURITY FEATURE PROFILE IN HOME SUBSCRIBER SERVER

CROSS-REFERENCE TO RELATED APPLICATIONS

This patent application claims priority under 35 U.S.C. §119(e) from Provisional Patent Application No. 61/284,045 filed Dec. 11, 2009, the disclosure of which is incorporated by reference herein in its entirety.

TECHNICAL FIELD

The teachings in accordance with the exemplary and non-limiting embodiments of this invention relate generally to wireless communication systems, methods, devices and computer programs and, more specifically, relate to generic bootstrapping architectures and to security functions.

BACKGROUND

This section is intended to provide a background or context to the invention that is recited in the claims. The description herein may include concepts that could be pursued, but are not necessarily ones that have been previously conceived, implemented or described. Therefore, unless otherwise indicated herein, what is described in this section is not prior art to the description and claims in this application and is not admitted to be prior art by inclusion in this section.

The following abbreviations that may be found in the specification and/or the drawing figures are defined as follows:
AAA authentication authorization accounting
AKA authentication and key agreement
AUTN authentication token
AV Authentication Vector
AVP attribute-value-pair in diameter messages
BSF bootstrapping server function
CK confidential key
GAA generic authentication architecture
GBA generic bootstrapping architecture
GPL generic push layer
GSID GAA service identifier
GUSS GBA user security settings
HLR home location register
HSS home subscriber server
IK integrity key
IMS internet protocol (IP) multimedia subsystem
LDAP lightweight directory access protocol
NAF network application function (service)
NDS network domain security
RAND random challenge
SLF subscriber locator function
TLS transport layer security
UE user terminal with smart card
UICC universal integrated circuit card
USS user security settings
Ua UE-NAF interface for GAA applications
Ub UE-BSF interface for bootstrapping
XRES expected response in authentication
Zh BSF-HSS interface for bootstrapping procedure
Zh' BSF-HLR interface for bootstrapping procedure
Zn BSF-NAF interface for GAA applications
Zpn NAF-BSF interface for GAA applications
Reference can be made to the following two publications:
  3GPP TS 29.109 V9.0.0 (2009-09) Technical Specification 3rd Generation Partnership Project; Technical Specification Group Core Network and Terminals; Generic Authentication Architecture (GAA); Zh and Zn Interfaces based on the Diameter protocol; Stage 3 (Release 9); and
  3GPP TS 33.224 V9.0.0 (2009-09) Technical Specification 3rd Generation Partnership Project; Technical Specification Group Services and System Aspects; Generic Authentication Architecture (GAA); Generic Bootstrapping Architecture (GBA) Push Layer (Release 9).

In mobile devices the use of the GBA enables authentication of a user or subscriber. The use of GBA assumes that the user has a valid identity on a HLR or a HSS. The user authentication is instantiated by a shared secret, for mobile networks one in a smart card in the mobile device and the other in the HLR/HSS. In different network architectures e.g. fixed networks, the shared secret might be stored in a trusted module (e.g. trusted chip on PC) and in the network in a AAA server. GBA authenticates the user by having a network component challenge the smart card and then verifying that the answer to the challenge is similar to one predicted by the HLR/HSS using the AKA protocol. The BSF establishes an additional credential (so called Ks). From this credential it derives service provider specific shared keys between the authenticating entity and the service provider. In operation the secret in the smart card is used to authenticate to the network. Then the BSF derives a master secret and from this the service-specific keys. The terminal is deriving the same keys. Each service thus has different keys (if one is compromised only one service is affected). The service specific shared secret is limited in time and for a specific service domain (called Ks_(ext/int)_NAF). The SLF is a function that informs the BSF on which HSS to find subscriber data, in a case where the network operator has several HSS.

One problem that exists at present in the GBA relates to a situation that arises when a service (NAF) wants to establish a security association with the authenticating entity in the UE, in particular a smart card. For this to occur the NAF needs to know that the security features are supported for the establishment of the security association. Currently the service providing NAF has no means to obtain this information from the terminal or from the network. It can be noted that the NAF may reside outside the operator network and, as a result, will not have a direct interface to the HSS.

SUMMARY

In an exemplary aspect of the invention there is a method, comprising determining at a network application function a list of desired user equipment security features to be used, the security features of the list ordered by preference of the network application function, sending the list to a database of user security settings via a bootstrapping server function, and receiving by the network application function, via the bootstrapping server function, a security features response comprising a security key, derived from information stored in the database, corresponding to a desired security feature contained in the list, thereby informing the network application function of the availability of at least one of the desired security features in the user equipment.

In another exemplary aspect of the invention there is a non-transitory computer readable medium embodying computer program instructions, the computer program instructions executed by at least one processor to perform operations comprising determining at a network application function a list of desired user equipment security features to be used, the security features of the list ordered by preference of the network application function, sending the list to a database of user security settings via a bootstrapping server function, and receiving by the network application function, via the bootstrapping server function, a security features response comprising a security key, derived from information stored in the database, corresponding to a desired security feature contained in the list, thereby informing the network application function of the availability of at least one of the desired security features in the user equipment.

In still another exemplary aspect of the invention there is apparatus comprising at least one processor; and at least one memory including computer program code, where the at least one memory and the computer program code are configured, with the at least one processor, to cause the apparatus to at least determine, at a network application function, a list of desired user equipment security features to be used, the security features of the list ordered by preference of the network application function, send the list to a database of user security settings via a bootstrapping server function, and receive by the network application function, via the bootstrapping server function, a security features response comprising a security key, derived from information stored in the database, corresponding to a desired security feature contained in the list, thereby informing the network application function of the availability of at least one of the desired security features in the user equipment.

BRIEF DESCRIPTION OF THE DRAWINGS

The foregoing and other aspects of embodiments of this invention are made more evident in the following Detailed Description, when read in conjunction with the attached Drawing Figures, wherein.

DETAILED DESCRIPTION

The exemplary embodiments of this invention provide enhancements for the HSS, the BSF and the NAF.

Figure 1:
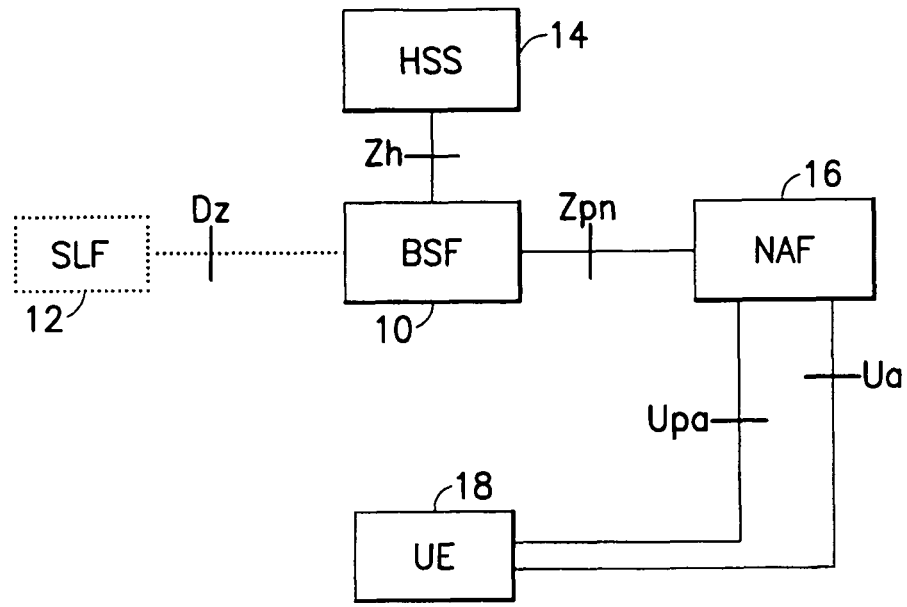
FIG. 1 is a block diagram of the GBA push architecture.
Figure 2:
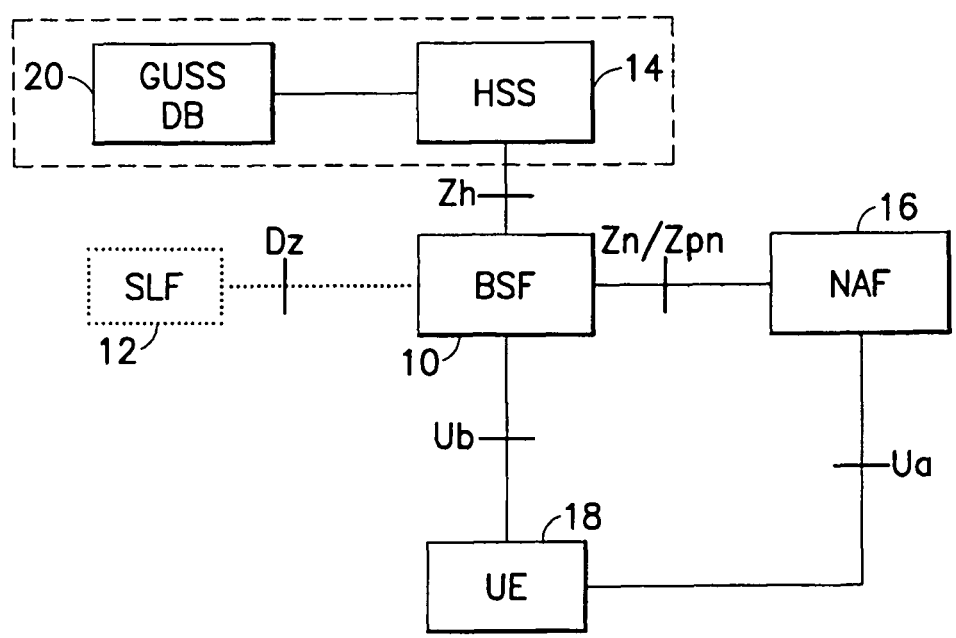
FIG. 2 is a block diagram of the GBA architecture.
Figure 3:
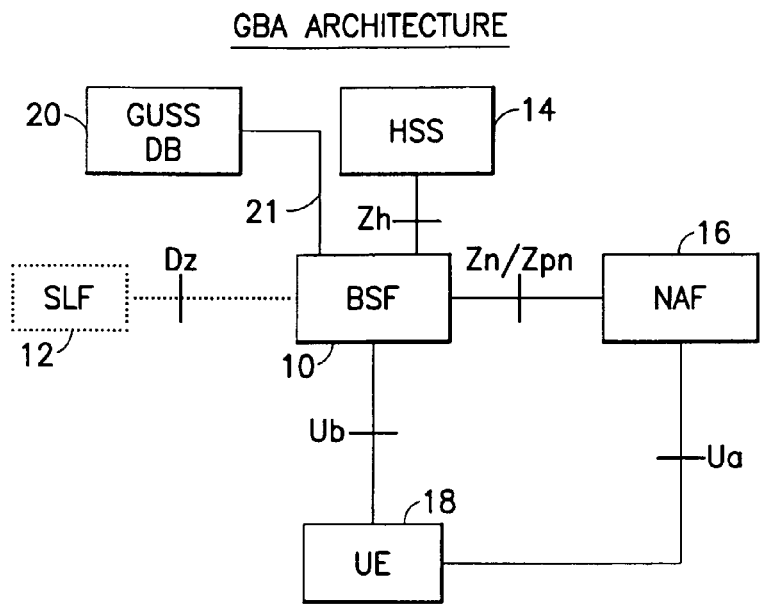
FIG. 3 is a block diagram of another embodiment of the GBA architecture.

FIG. 1 shows a block diagram of the GBA Push architecture. Shown are the BSF 10, SLF 12, HSS 14, NAF 16 and the UE 18. These blocks are interconnected via the interfaces noted above. FIG. 2 shows a block diagram of the GBA architecture. In addition to the blocks shown in FIG. 1, a GUSS database (DB) 20 is shown as a part of the HSS 14. FIG. 3 is another embodiment of the GBA architecture, where the GUSS DB 20 is assumed to be external to the network, and connected with the BSF 10 via some suitable interface 21.

Figure 4A:
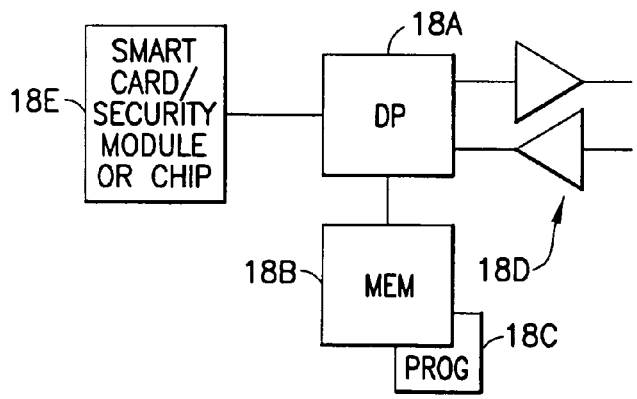
FIGS. 4A and 4B are simplified block diagrams of the UE and BSF/HSS/NAF, respectively, shown in FIGS. 1-3.

FIG. 4A shows a simplified block diagram of an embodiment of the UE 18. For the purposes of describing the exemplary embodiments of this invention the UE 18 can be assumed to include a controller, such as at least one computer or a data processor (DP) 18A, a computer-readable memory medium embodied as at least one memory (MEM) 18B that stores a program of computer instructions (PROG) 18C, and at least one suitable transceiver, such as a radio frequency (RF) transceiver 18D, for bidirectional (e.g., wireless) communications with the BSF 10 and the NAF 16 via one or more intermediate nodes, such as one or base stations, converting nodes or proxies (not shown). The UE 18 is assumed to include a smart card or trusted module 18E for secure credential handling 1 comprised of memory and other functionality. In general, this function can be incorporated in a card, such as a removable card, or in a secure (trusted) chip or module (not necessarily a card). The smart card or secure module 18E may include, or may be embodied in or with, a subscriber identity module (SIM).

The smart card or trusted module 18E may also be referred to as a UICC. As is well known, the UICC is the smart card used in mobile terminals in GSM and UMTS networks, but it might also be implemented with a different form factor, e.g., on a trusted hardware chip. The UICC ensures the security of the interaction between the user device (mobile phone, PC, smart card) and the network. In a GSM network the smart card is a SIM card. The UICC may contain a SIM application, in an UMTS network it contains the USIM application and for IMS networks an ISIM application. A UICC may contain several applications in parallel, making it possible for the same smart card to give access to both GSM and UMTS networks and other application (e.g. mobile banking, support for Mobile TV, etc). In a CDMA network the UICC contains a CSIM application, in addition to 3GPP USIM and SIM applications.

Figure 4B:
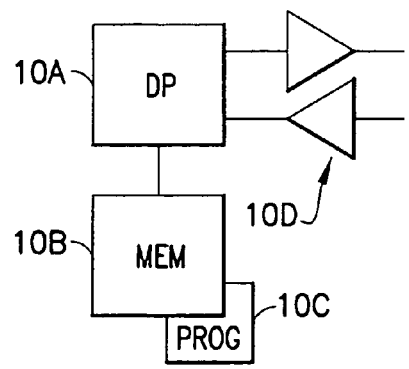

FIG. 4B shows a simplified block diagram of an embodiment of apparatus that can be used for implementing one or all of the BSF 10, HSS 14 and NAF 16. Basically, these components may be viewed as computer system having, for example in the case of the BSF 10, a controller, such as at least one computer or a data processor (DP) 10A, a computer-readable memory medium embodied as at least one memory (MEM) 10B that stores a program of computer instructions (PROG) 10C, and at least one suitable transceiver for bidirectional communications via the defined interfaces (Zh, Zn, Zpn, Ub, Dz) with the other components of the GBA architecture. There are further interfaces for the case of proxy usage or usage of HLR. But these additional interfaces are shown in FIG. 4B.

It has previously been agreed in 3GPP that the information relating to whether the UE smart card 18E supports the establishment of the security association should be stored in the HSS GUSS 20. This has been documented in 3GPP TS 33.224 as "The GPL_U capabilities shall be stored in the GUSS in the HSS." However, the mechanism, message flow and processing has not been defined for how this proposed functionality would be embodied, implemented and operated.

The use of exemplary embodiments of this invention enable the use of a smart card, or more generally, a security or application specific feature by a service provider, where the service provider is enabled to indicate which smart card 18E feature (i.e., which security or application-specific feature) is to be used, as well as to identify a second choice ("second best") feature.

In accordance with the exemplary embodiments messages between the service and the key generating node (BSF 10) and between the BSF 10 and the HSS 14 are extended. The user security information storage in the HSS 14 is extended as well, and the HSS 14 processes this additional information. The BSF 10 is expected to consider the indication given by the HSS 14.

The end result is that the service knows what feature can be used when communicating with the UE 18 and thus is able to establish the desired security association.

This feature is particularly advantageous when, for example and considering a more specific case of particular interest the exemplary embodiments of this invention, the NAF 16 wants to establish a secure session using the GPL with the smart card 18. One reason to do this is for, by example, provisioning purposes.

The exemplary embodiments of this invention provide enhancements to the GUSS 20 and the related GBA components.

Figure 5:
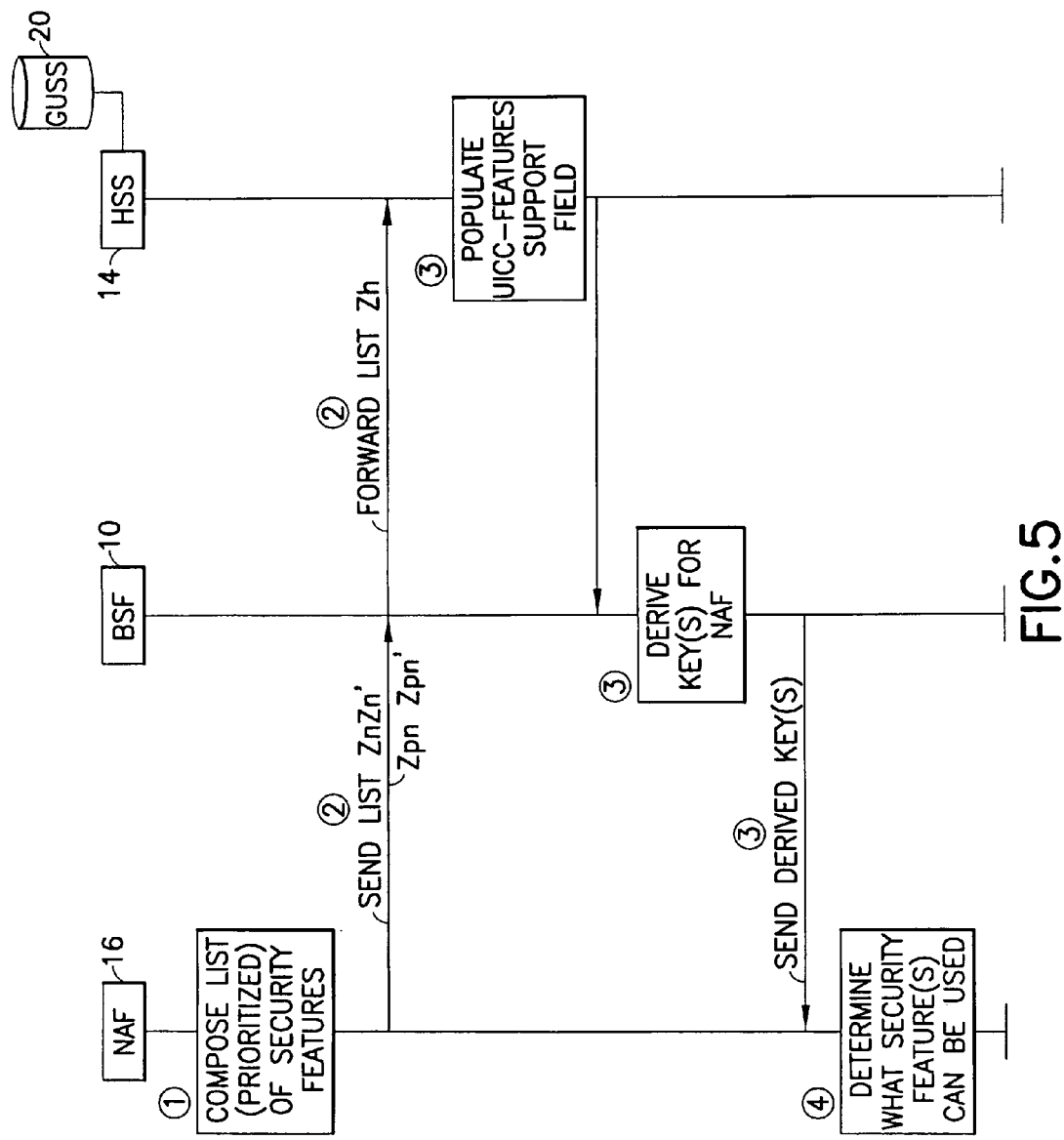
FIG. 5 is a signal/message flow diagram in accordance with the exemplary embodiments of this invention.

Reference is now made to the signal/message flow diagram of FIG. 5.

(1) Assume that the NAF 16 wants to use a specific security (or application) feature, such as GPL_U. The NAF 16 may be willing to "downgrade" if this feature is not available or restrict the service usage (e.g., threshold for download value is lower, since the security level is lower). This ability to use another backup feature can be beneficial in reducing signaling load when the first desired feature is not available. In this example, assume that the first desired feature is GPL_U, the second desired feature would be GPL with GBA_U, and the third desired feature would be GPL with GBA divided by a ";" sign to enable the receiving node to determine that the next "word" begins. The element may appear several times for several features. For example, the NAF 16 desires to use several security features and gives a prioritization list for each of them (e.g., {feature1; feature2; . . . ; feature$_n$}).

Thus, one exemplary aspect of the invention is an ability to indicate a desired security feature, with the possibility to provide a prioritized list of desired security features.

(2) The NAF 16 indicates to the BSF 10 that the NAF 16 wishes to use a specific security feature (e.g., GPL_U). This can be accomplished by adding a field to existing Zn/Zn' messages. The Zn is defined for Diameter and Web Service based on 3GPP TS 29.109. The Zn' is the interface for the case that there is a proxy between the BSF 10 and the NAF 16. The BSF 10 forwards this request over the Zh reference point to the HSS 14. This can be accomplished by adding a field to the Zh request message. In a case where a HLR is utilized the BSF 10 may send this to a local database that holds the GUSS 20, and utilize the Zh' interface as is. In this case the request is not part of the standard, and may be performed using an LDAP request.

In an exemplary aspect of the invention the request from the NAF can be a GBA-Push-Info (GPI), for NAF specific key material corresponding to a user identity. In addition, the request can utilize a Zpn and Zpn' protocol interface, for example as defined in 3GPP TS 33.223. The protocol ZPN being between the NAF and BSF and the request can include, for example, a user identity, NAF-Id, and/or GSID. Further, a field for the Security Features Request element can read as "element name="securityfeaturesrequest" type="xsd:string" minOccurs="0"." The NAF may request information on the availability of security features using a Security Features Request element or parameter. The element may contain a semicolon-separated list of security features that are available ordered by preference. In accordance with the embodiments, the NAF may request information on the availability of security features using a Security Feature Request AVP. In addition, the AVP can include a 3GPP AV=[RAND, AUTN, XRES, CK, IK]. The Security Feature Request AVP can be of type OctetString. The AVP can contain one or several of the security features requested by the NAF.

If the BSF and the NAF are located within the same operator's network, then a DIAMETER based Zpn reference point can be secured according to NDS/IP. Whereas, if the BSF and the NAF are located in different operators' networks, the DIAMETER based Zpn' reference point between a Zn-Proxy and the BSF can be secured using TLS.

Thus, another exemplary aspect of the invention is an ability to enhance the Zn/Zn', Zpn/Zpn', and Zh with the security feature indication(s).

(3) To the GUSS 20 may be added a new field (not in the BSF field, since that will be stripped off). One exemplary place for the field containing the new element to be added is in the ussType complexType, for example, one can add an "UICC-Features" or more generally a "Security-Features" support field. If the HSS 14 receives the list of NAF-originated prioritized features from the BSF 10, it then populates the Securities-Features support field with the provided feature(s). If appropriate the field can also set a UICC keychoice field, so that the BSF 10 derives the correct application specific key, e.g. Ks_int_NAF.a.

In an exemplary aspect of the invention if the BSF supports the usage of a security feature and the NAF has requested the security feature from the BSF, the BSF can extract a security features element from a bsfInfo element in a subscriber's GUSS and add those security features to a Security Features Response element in the response which are common in the received Security Features request from the NAF and the extracted information from the bsfInfo element. The value of an optional element "securityFeatures" in the element "bsfInfo" indicates a user specific security feature list that a user equipment supports. If a Security Feature element is missing then the security features are not defined, and if there is a list of several values, they are separated by ";".

The common security features can be added to the Security Features Response element in the order as they appear in the bsfInfo element. If a Security Features element is not defined in the GUSS, or there is no common security feature, the BSF shall add an empty string to the Security Features Response element in the response. A Security Feature Response AVP can be of a type OctetString. The AVP contains one or several of the security features identified by an HSS. This information can be conveyed to the BSF using a security Features element, such as in the "bsfElement" of the GUSS, and the Security Features received in the request. Further, a field for the Security Features Response element can read, for example, as "element name="securityfeaturesresponse" type="xsd:string" minOccurs="0"."

Thus, another exemplary aspect of the invention is at least an ability to process the list of desired feature(s) in the HSS 14 and BSF 10.

Note in this regard that the BSF 10 may only derive one key, although it is within the scope of these exemplary embodiments for the BSF 10 to derive more than one (e.g., it could derive a key for every feature that appears in the prioritized list if the feature is supported).

(4) The NAF 16 then receives the derived service specific key(s) from the BSF 10 and additionally obtains knowledge of what security level is possible for the communication between the NAF 16 has obtained, and what feature(s) of the smart card 18E the NAF 16 can use. The BSF 10 receives the GUSS and sends part of the GUSS, i.e., the USS to the NAF 16. This USS will contain the security feature information requested by the NAF 16.

Thus, another exemplary aspect of the invention is the inclusion of additional information which may be passed via fields such as in any of Zn/Zn', Zpn/Zpn', and Zh, and the processing of this information in the BSF 10 and the NAF 16.

The exemplary embodiments also cover a case where the HLR is used instead of the HSS 14, and where the GUSS 20 is stored on some proprietary external database (e.g., as in FIG. 3), so that the BSF 10 simply makes a call to the call to the external GUSS.

The exemplary embodiments also cover a case where security features of interest are not part of the smart card 18E. For example, the security features may be part of a secure chip (e.g., a payment application contained in a secure chip).

Based on the foregoing it should be apparent that the exemplary embodiments of this invention provide a method, apparatus and computer program(s) to enhance the operation of the GBA architecture so as to overcome an inherent lack of a defined GBA-smart card profile in the existing GBA or, more generically, the lack of a security feature profile, and furthermore thus avoid having to define and support a new terminal smart card (security feature profile) interface in order to achieve the same goals.

Figure 6:
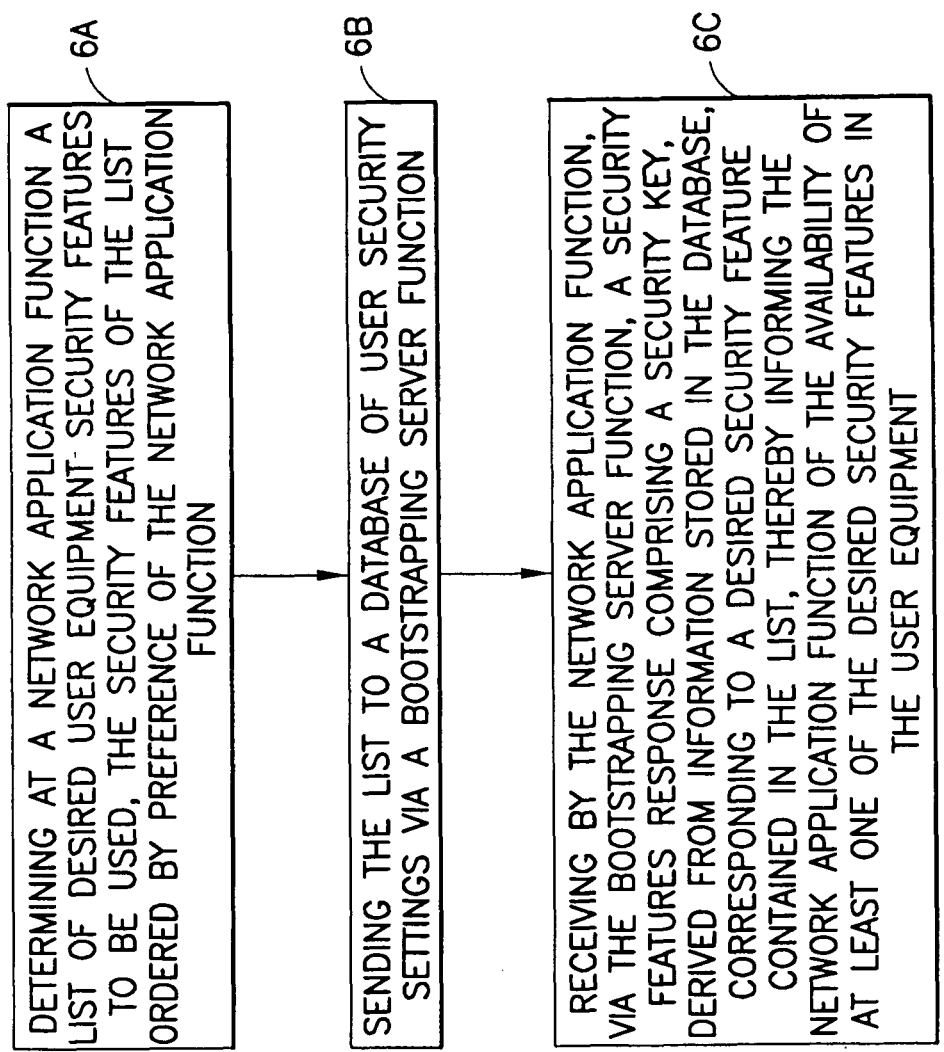
FIG. 6 is a logic flow diagram that illustrates the operation of a method, and a result of execution of computer program instructions embodied on a computer readable memory, in accordance with the exemplary embodiments of this invention.

FIG. 6 is a logic flow diagram that illustrates the operation of a method, and a result of execution of computer program instructions, in accordance with the exemplary embodiments of this invention. In accordance with these exemplary embodiments a method performs, at Block 6A, a step of determining at a network application function a list of desired user equipment security features to be used, the security features of the list ordered by preference of the network application function. At Block 6B the list is sent to a database of user security settings via a bootstrapping server function. At Block 6C the network application function receives via the bootstrapping server function a security feature response comprising a security key, derived from information stored in the database, corresponding to a desired security feature contained in the list, thereby informing the network application function of the availability of at least one of the desired security features in the user equipment.

The method as in the preceding paragraph where security feature response comprises an indication of the security features common to the list, and where the common security features are ordered as derived from the information stored in the database.

The method as in the preceding paragraphs, where the key corresponds to a most preferred security feature, if available, otherwise the key corresponds to a lesser preferred security feature.

The method as in the preceding paragraphs, where the list is sent to the database of user security settings via a home subscriber server.

The method as shown in FIG. 6, where the database is external to the system that contains the network application function and the bootstrapping server function.

The method as in the preceding paragraphs, where the database comprises a field for storing supported security features.

The method as in the preceding paragraphs, where the list contains a single entry, or contains two or more entries.

The method as in the preceding paragraphs, where the list is sent in a security features request message.

The method as in the preceding paragraph, wherein the security features request message is sent using an attribute value pair diameter message.

The various blocks shown in FIG. 6 may be viewed as method steps, and/or as operations that result from operation of computer program code, and/or as a plurality of coupled logic circuit elements constructed to carry out the associated function(s).

The exemplary embodiments also encompass an apparatus that comprises a processor and a memory including computer program code, where the memory and computer program code are configured to, with the processor, cause the apparatus at least to perform, determining at a network application function a list of desired user equipment security features to be used, the security features of the list ordered by preference of the network application function, sending the list to a database of user security settings via a bootstrapping server function, and receiving via the bootstrapping server function a security feature response comprising a security key, derived from information stored in the database, the key corresponding to a desired security feature contained in the list, thereby informing the network application function of the availability of at least one of the desired security features in the user equipment.

In general, the various exemplary embodiments may be implemented in hardware or special purpose circuits, software, logic or any combination thereof. For example, some aspects may be implemented in hardware, while other aspects may be implemented in firmware or software which may be executed by a controller, microprocessor or other computing device, although the invention is not limited thereto. While various aspects of the exemplary embodiments of this invention may be illustrated and described as block diagrams, flow charts, or using some other pictorial representation, it is well understood that these blocks, apparatus, systems, techniques or methods described herein may be implemented in, as non-limiting examples, hardware, software, firmware, special purpose circuits or logic, general purpose hardware or controller or other computing devices, or some combination thereof.

It should thus be appreciated that at least some aspects of the exemplary embodiments of the inventions may be practiced in various components such as integrated circuit chips and modules, and that the exemplary embodiments of this invention may be realized in an apparatus that is embodied as an integrated circuit. The integrated circuit, or circuits, may comprise circuitry (as well as possibly firmware) for embodying at least one or more of a data processor or data processors, a digital signal processor or processors, baseband circuitry and radio frequency circuitry that are configurable so as to operate in accordance with the exemplary embodiments of this invention.

Various modifications and adaptations to the foregoing exemplary embodiments of this invention may become apparent to those skilled in the relevant arts in view of the foregoing description, when read in conjunction with the accompanying drawings. However, any and all modifications will still fall within the scope of the non-limiting and exemplary embodiments of this invention.

For example, while the exemplary embodiments have been described above in the context of the GBA architecture it should be appreciated that the exemplary embodiments of this invention are not limited for use with only this one particular type of system, and that they may be used to advantage in other systems.

It should be noted that the terms "connected," "coupled," or any variant thereof, mean any connection or coupling, either direct or indirect, between two or more elements, and may encompass the presence of one or more intermediate elements between two elements that are "connected" or "coupled" together. The coupling or connection between the elements can be physical, logical, or a combination thereof As employed herein two elements may be considered to be "connected" or "coupled" together by the use of one or more wires, cables and/or printed electrical connections, as well as by the use of electromagnetic energy, such as electromagnetic energy having wavelengths in the radio frequency region, the microwave region and the optical (both visible and invisible) region, as several non-limiting and non-exhaustive examples.

Further, the various names used for the described functions (e.g., NAF, HSS, BSF, etc.), protocol interfaces (e.g., Zn, Zn', Zh, Zpn, Zpn' etc.), service features (e.g., GPL_U, GBA_U, etc.) and elements (e.g., ussType complexType) are not intended to be limiting in any respect, as these various functions, interfaces, service features, elements and the like may be identified by any suitable names.

Furthermore, some of the features of the various non-limiting and exemplary embodiments of this invention may be used to advantage without the corresponding use of other features. As such, the foregoing description should be considered as merely illustrative of the principles, teachings and exemplary embodiments of this invention, and not in limitation thereof.

What is claimed is:

1. A method, comprising:

determining at a network application function a preferred order list of desired user equipment security features to be used;

sending the preferred order list to a database of user security settings via a bootstrapping server function, where the database comprises a generic bootstrapping architecture user security settings database, where the preferred order list is sent in a security features request message, where the security features request message is sent using an using an attribute value pair diameter message, and where the security features request comprises an element which reads "element name="securityFeaturesRequest" type="xsd:string" minOccurs="0""; and receiving by the network application function, via the bootstrapping server function, a security features response comprising a security key, derived from information stored in the database, corresponding to a desired security feature contained in the list, thereby informing the network application function of an availability of at least the desired security feature in the user equipment.

2. The method according to claim 1, where the security features response comprises an indication of the security features common to the list, and where the common security features are ordered as derived from the information stored in the database.

3. The method according to claim 1, where the preferred order list is sent to the database of user security settings via a home subscriber server.

4. The method according to claim 1, where the database is external to the system that contains the network application function and the bootstrapping server function.

5. The method according to claim 1, where the database comprises a field for storing supported security features.

6. The method according to claim 1, where the security features request message is of type OctetString.

7. The method according to claim 1, where the attribute value pair diameter message contains the desired user equipment security features.

8. The method according to claim 1, where the security features request message comprises the desired user equipment security features separated by semicolons in their preferred order.

9. A non-transitory computer-readable medium embodying computer program instructions, the computer program instructions executed by at least one processor to perform the operations comprising:

determining at a network application function, a preferred order list of desired user equipment security features to be used;

sending the preferred order list to a database of user security settings via a bootstrapping server function, where the database comprises a generic bootstrapping architecture user security settings database, where the preferred order list is sent in a security features request message, where the security features request message is sent using an attribute value pair diameter message, and where the security features request comprises an element which reads "element name="securityFeaturesRequest" type="xsd:string" minOccurs="0""; and receiving by the network application function, via the bootstrapping server function, a security features response comprising a security key, derived from information stored in the database, corresponding to a desired security feature contained in the list, thereby informing the network application function of an availability of at least the desired security feature in the user equipment.

10. The computer readable medium according to claim 9, where the security features response comprises an indication of the security features common to the list, and where the common security features are ordered as derived from the information stored in the database.

11. An apparatus comprising at least one processor; and at least one memory including computer program code, where the at least one memory and the computer program code are configured, with the at least one processor, to cause the apparatus to at least:

determine, at a network application function, a preferred order list of desired user equipment security features to be used;

send the preferred order list to a database of user security settings via a bootstrapping server function, where the database comprises a generic bootstrapping architecture user security settings database, where the preferred order list is sent in a security features request message, where the security features request message is sent using an attribute value pair diameter message, and where the security features request comprises an element which reads "element name="securityFeaturesRequest" type="xsd:string" minOccurs="0""; and receive by the network application function, via the bootstrapping server function, a security features response comprising a security key, derived from information stored in the database, corresponding to a desired security feature contained in the list, thereby informing the network application function of an availability of at least the desired security feature in the user equipment.

12. The apparatus according to claim 11, where the security features response comprises an indication of the security features common to the list, and where the common security features are ordered as derived from the information stored in the database.

13. The apparatus according to claim 11, where the preferred order list is sent to the database of user security settings via a home subscriber server.

14. The apparatus according to claim 11, where the database is external to the system that contains the network application function and the bootstrapping server function.

15. The apparatus according to claim 11, where the database comprises a field for storing supported security features.

16. The apparatus according to claim 11, where the security features request message is of type OctetString.

17. The apparatus according to claim 11, where the attribute value pair diameter message contains the desired user security features.

18. The apparatus according to claim 11, where the security features request message comprises the desired user equipment security features separated by semicolons in their preferred order.

* * * * *